US009808026B2

(12) United States Patent
Gustav et al.

(10) Patent No.: US 9,808,026 B2
(45) Date of Patent: Nov. 7, 2017

(54) METHOD FOR MANUFACTURING A CONFECTIONERY SHELL

(75) Inventors: Thorsten Gustav, Solihull (GB); Paula Mora Castrillon, Munich (DE)

(73) Assignee: Kraft Foods R&D, Inc., Deerfield, IL (US)

( * ) Notice: Subject to any disclaimer, the term of this patent is extended or adjusted under 35 U.S.C. 154(b) by 801 days.

(21) Appl. No.: 14/131,192

(22) PCT Filed: Jul. 3, 2012

(86) PCT No.: PCT/US2012/045360
§ 371 (c)(1),
(2), (4) Date: Apr. 4, 2014

(87) PCT Pub. No.: WO2013/006599
PCT Pub. Date: Jan. 10, 2013

(65) Prior Publication Data
US 2014/0220229 A1    Aug. 7, 2014

(30) Foreign Application Priority Data

Jul. 6, 2011    (EP) .................................... 11172832

(51) Int. Cl.
A23G 3/00    (2006.01)
A23G 3/50    (2006.01)
(Continued)

(52) U.S. Cl.
CPC ............. *A23G 3/50* (2013.01); *A23G 1/0053* (2013.01); *A23G 1/0069* (2013.01);
(Continued)

(58) Field of Classification Search
CPC .......... A23G 1/00; A23G 1/0076; A23G 1/30; A23G 1/36; A23G 3/008; A23G 3/0029;
(Continued)

(56) References Cited

U.S. PATENT DOCUMENTS 1,647,944 A    11/1927    Villasenor
1,775,549 A     9/1930    Birdseye
(Continued)

FOREIGN PATENT DOCUMENTS

AU    199957075    5/2000
BE      1017445    9/2008
(Continued)

OTHER PUBLICATIONS

Australian Patent Office, Office Action dated Jul. 2, 2014, from Australian Patent Application No. 2012279251, 3 pages.
(Continued)

*Primary Examiner* — Jyoti Chawla
(74) *Attorney, Agent, or Firm* — Fitch, Even, Tabin & Flannery LLP

(57) ABSTRACT

A method of manufacturing confectionery shells using cold-stamping is provided. The method can also be used to manufacture multi-layered confectionery shells and/or confectionery shells comprising inclusions. Scraping means are passed outwardly over the boundary of the mould cavity in two or more different outward directions.

16 Claims, 3 Drawing Sheets

(51) Int. Cl.
*A23G 1/00* (2006.01)
*A23G 1/54* (2006.01)
*A23G 3/34* (2006.01)

(52) U.S. Cl.
CPC ............. *A23G 1/0076* (2013.01); *A23G 1/54* (2013.01); *A23G 1/545* (2013.01); *A23G 3/004* (2013.01); *A23G 3/0029* (2013.01); *A23G 3/0074* (2013.01)

(58) Field of Classification Search
CPC ...... A23G 3/54; A23G 3/0065; A23G 3/0068; A23G 3/0252; A23G 3/545; A23G 4/10; A23G 4/20; A23G 2200/12; A23G 2220/20; A23G 1/0053; A23G 3/0074; A23G 3/50
USPC ................................. 426/103, 138, 302, 660
See application file for complete search history.

(56) References Cited

U.S. PATENT DOCUMENTS

| | | | |
|---|---|---|---|
| 2,671,417 A | 3/1954 | Jacobsen | |
| 2,796,033 A | 6/1957 | Feinstein | |
| 3,027,728 A | 4/1962 | Greer | |
| 3,233,562 A | 2/1966 | Nakamura | |
| 3,798,337 A * | 3/1974 | Abalo | A23G 3/0294 264/101 |
| 4,104,411 A | 8/1978 | Pooler | |
| 4,501,544 A * | 2/1985 | Akutagawa | A23G 1/205 425/218 |
| 5,238,698 A | 8/1993 | Zumbe et al. | |
| 5,360,116 A | 11/1994 | Schmiletzky | |
| 5,360,166 A | 11/1994 | Nogi et al. | |
| 5,500,178 A | 3/1996 | Hayashi | |
| 5,705,217 A | 1/1998 | Aasted | |
| 5,789,005 A | 8/1998 | Tabaroni | |
| 5,832,697 A | 11/1998 | Rogers | |
| 6,165,531 A * | 12/2000 | Harding | A23G 1/226 426/512 |
| 6,180,158 B1 | 1/2001 | Zietlow | |
| 6,217,927 B1 | 4/2001 | Suttle | |
| 6,242,028 B1 | 6/2001 | Bean | |
| 6,406,732 B1 | 6/2002 | Lee | |
| 6,419,970 B1 | 7/2002 | Willcocks | |
| 2003/0090026 A1* | 5/2003 | Rasmussen | A21C 11/163 264/173.11 |
| 2004/0131751 A1 | 7/2004 | Dekker | |
| 2005/0175737 A1* | 8/2005 | Knobel | A23G 1/0069 426/89 |
| 2006/0057265 A1 | 3/2006 | Knobel | |
| 2006/0257517 A1 | 11/2006 | Steiner | |
| 2009/0274803 A1 | 11/2009 | Descamps | |
| 2012/0183650 A1 | 7/2012 | Liske | |
| 2014/0220229 A1 | 8/2014 | Gustav | |
| 2014/0234523 A1 | 8/2014 | Gustav | |
| 2014/0287102 A1 | 9/2014 | Gustav | |
| 2014/0328986 A1 | 11/2014 | Weers | |

FOREIGN PATENT DOCUMENTS

| | | | |
|---|---|---|---|
| BR | 9301046 | 8/1994 | |
| CH | 680411 | 8/1992 | |
| CN | 1083666 | 3/1994 | |
| CN | 1129393 | 8/1996 | |
| CN | 1431868 | 7/2003 | |
| CN | 1652691 | 8/2005 | |
| DE | 2812269 | 10/1978 | |
| DE | 142986 | 7/1980 | |
| DE | 29808288 | 9/1999 | |
| DE | 19830258 | 1/2000 | |
| DE | 19851063 | 5/2000 | |
| DE | 19853847 | 5/2000 | |
| DE | 102005018415 | 11/2006 | |
| DE | 102008019038 | 2/2010 | |
| EP | 0230763 | 8/1987 | |
| EP | 0589820 | 3/1994 | |
| EP | 0730827 | 9/1996 | |
| EP | 0914774 | 5/1999 | |
| EP | 0945069 | 9/1999 | |
| EP | 1103467 | 5/2001 | |
| EP | 1346641 | 9/2003 | |
| EP | 1413205 | 4/2004 | |
| EP | 1509092 | 3/2005 | |
| EP | 1604573 | 12/2005 | |
| EP | 2018811 | 1/2009 | |
| EP | 2386208 | 11/2011 | |
| FR | 1587835 | 3/1970 | |
| FR | 2539670 | 7/1984 | |
| FR | 2609237 | 7/1988 | |
| FR | 2801570 | 6/2001 | |
| GB | 459583 | 1/1937 | |
| GB | 645747 | 11/1950 | |
| GB | 769092 | 2/1957 | |
| GB | 1128525 | 9/1968 | |
| GB | 1214983 | 12/1970 | |
| GB | 1305520 | 2/1973 | |
| GB | 2140737 | 12/1984 | |
| GB | 2279286 | 1/1995 | |
| GB | 2335882 A * | 10/1999 | ........... A23G 3/0263 |
| GB | 2405827 | 1/2007 | |
| JP | 55023911 | 2/1980 | |
| JP | 56023838 | 3/1981 | |
| JP | 59120062 | 7/1984 | |
| JP | 61037077 | 2/1986 | |
| JP | 2092261 | 4/1990 | |
| JP | 6303907 | 11/1994 | |
| JP | 2009136193 | 6/2009 | |
| RU | 2041640 | 8/1995 | |
| RU | 2185071 | 7/2002 | |
| RU | 2246223 | 2/2005 | |
| WO | 9321087 | 10/1993 | |
| WO | 9404046 | 3/1994 | |
| WO | 9532633 | 12/1995 | |
| WO | 0180660 | 11/2001 | |
| WO | 03094626 | 11/2003 | |
| WO | 03099031 | 12/2003 | |
| WO | 2004068963 | 8/2004 | |
| WO | 2006122823 | 11/2006 | |
| WO | 2009040530 | 4/2009 | |
| WO | 2012171657 | 12/2012 | |

OTHER PUBLICATIONS

Australian Patent Office, Office Action dated Jun. 3, 2014, from Australian Patent Application No. 2012279094, 5 pages.
Australian Patent Office, Office Action dated Jun. 3, 2014, from Australian Patent Application No. 2012279200, 4 pages.
Australian Patent Office, Office Action dated Jun. 4, 2014, from Australian Patent Application No. 2012279126, 4 pages.
Australian Patent Office, Office Action dated May 12, 2015, from Australian Patent Application No. 2012279126, 3 pages.
Australian Patent Office, Office Action dated May 6, 2015, from Australian Patent Application No. 2012279251, 3 pages.
Chinese Patent Office, Office Action and Search Report dated Apr. 1, 2016, from Chinese Patent Application No. 201280043422.6, 22 pages.
Chinese Patent Office, Office Action and Search Report dated Feb. 2, 2015, from Chinese Patent Application No. 201280043422.6, 26 pages.
Chinese Patent Office, Office Action and Search Report dated Feb. 5, 2015, from Chinese Patent Application No. 201280033501.9, 19 pages.
Chinese Patent Office, Office Action and Search Report dated Jan. 19, 2015, from Chinese Patent Application No. 201280043393.3, 18 pages.
Chinese Patent Office, Office Action and Search Report dated Nov. 2, 2015, from Chinese Patent Application No. 201280043422.6, 20 pages.

(56) References Cited

OTHER PUBLICATIONS

Chinese Patent Office, Office Action dated Dec. 16, 2015, from Chinese Patent Application No. 201280033501.9, 14 pages.
Chinese Patent Office, Office Action dated Feb. 2, 2015, from Chinese Patent Application No. 201280043380.6, 22 pages.
Chinese Patent Office, Office Action dated Jul. 5, 2016, from Chinese Patent Application No. 201280033501.9, 16 pages.
Chinese Patent Office, Office Action dated Oct. 23, 2015, from Chinese Patent Application No. 201280043380.6, 14 pages.
Electronics Cooling. Thermal Conductivity of Rubbers. Mar. 10, 2010, Retrieved from Internet Archive URL: <https:// web.archive.org/web/20100315052438/http://www.electronics-cooling.com/2001/11/the-thermal-conductivity-of-rubbers-elastomers/>, 4 pages.
Europan Patent Office Search Report of European Applicatin No. 11172831, dated Feb. 1, 2012.
European Search Report and Written Opinion, European Application 11172832.5, dated Feb. 10, 2012, 9 pages.
European Search Report, European Patent Application No. 11172834.1, dated Feb. 16, 2012, 9 pages.
Extended European Search Report, European Application No. 11172831.7, dated Feb. 17, 2012, 11 pages.
International Search Report and Written Opinion, International Patent Application PCT/US2012/044857, Dec. 3, 2012, 10 pages.
International Search Report and Written Opinion, International Patent Application PCT/US2012/045196, dated Nov. 21, 2012, 13 pages.
International Search Report and Written Opinion, International Patent Application PCT/US2012/045219, dated Dec. 3, 2012, 22 pages.
International Search Report and Written Opinion, International Patent Application PCT/US2012/045360, dated Nov. 23, 2012, 16 pages.
Lasance, Clemens J.M. "The Thermal Conductivity of Rubbers/Elastomers." Engineering Toolbox, Feb. 4, 2009, Retrieved from Internet Archive URL: <https://web.archive.org/web/20090204033803/http://engineeringtoolbox.com/thermal-conductivity-d_429.html>, 2 pages.
New Zealand Patent Office, Office Action dated Jan. 6, 2016, from New Zealand Patent Application No. 619689, 2 pages.
New Zealand Patent Office, Office Action dated Nov. 6, 2014, from New Zealand Patent Application No. 619689, 2 pages.
New Zealand Patent Office, Office Action dated Nov. 7, 2014, from New Zealand Patent Application No. 619794, 2 pages.
New Zealand Patent Office, Office Action dated Oct. 2, 2014, from New Zealand Patent Application No. 619608, 2 pages.
New Zealand Patent Office, Office Action dated Oct. 2, 2014, from New Zealand Patent Application No. 619609, 2 pages.
Partial European Search Report, European Application 11172833.3, dated Mar. 2, 2012, 10 pages.
Russian Patent Office, Decision to Grant dated Jan. 25, 2017, from Russian Patent Application No. 2014103150, 14 pages.
Russian Patent Office, Office Action dated Apr. 11, 2016, from Russian Patent Application No. 2014102481, 7 pages.
Russian Patent Office, Office Action dated Apr. 11, 2016, from Russian Patent Application No. 2014102649, 7 pages.
Russian Patent Office, Office Action dated Aug. 15, 2016, from Russian Patent Application No. 2014103150, 6 pages.
Russian Patent Office, Office Action dated May 13, 2016, from Russian Patent Application No. 2014103313, 4 pages.

* cited by examiner

METHOD FOR MANUFACTURING A CONFECTIONERY SHELL

CROSS REFERENCE TO RELATED APPLICATIONS

This application is a U.S. national phase application of International Application No. PCT/US2012/045360, filed Jul. 3, 2012, designating the United States, which claims benefit from EP Application No. 11172832.5, filed Jul. 6, 2011, both of which are hereby incorporated herein by reference in their entirety.

TECHNICAL FIELD

The present invention relates to a method of manufacturing a confectionery shell using cold-stamping and a confectionery shell produced by the method. The method facilitates the manufacture of confectionery shells of different thicknesses using a single stamp and mould. The method further facilitates the manufacture of multi-layered confectionery shells and/or confectionery shells comprising inclusions of varying size.

BACKGROUND OF THE INVENTION

Confectionery shells provide a structurally firm outer in which confectionery fillings can be placed and are a well-known aspect of confectionery manufacture. A confectionery shell may also serve as a matrix in which pieces of edible material are dispersed. These inclusions have a different composition to that of the confectionery shell. Confectionery shells having a multi-layered structure are also known. The layers of the shell may differ in terms of their composition and/or colour.

It is known to manufacture a confectionery shell by depositing shell material into a mould cavity, vibrating the mould to remove air bubbles in the material and inverting the mould to remove excess material ("inversion method"). However, this method suffers from the disadvantage that the excess material must be collected and treated (e.g. re-tempering of chocolate) to avoid wastage. Also, the shell typically does not have a uniform thickness, especially when using a shell material having a relatively high viscosity. This imposes restrictions on the composition (e.g. fat content) of the material.

An improved method for manufacturing a confectionery shell involves immersing a chilled stamp into the shell material in a mould cavity to shape and solidify the material against the wall of the cavity ("cold-stamping"). This produces a shell having a uniform thickness and does not produce as much excess material as the inversion method. Furthermore, cold-stamping is not as dependent on the viscosity of the shell material.

For instance, US-A-2006/0057265 describes a cold-stamping process in which the substance forming the confectionery shell is placed under pressure after the stamp is introduced into the mould. The process uses a stamp having an axial bore through which pressure is exerted by means of a pressure-transmitting medium.

US-A-2006/0257517 concerns a cold-stamping process in which the stamp has a flange that covers the mould boundary. The flange is fitted with a deformable toroid sealing means which serves to enclose the substance forming the confectionery shell once the stamp is placed in the mould.

However, producing confectionery shells of a constant thickness by conventional cold-stamping technology requires accurate stamps and moulds. If the stamps and moulds are not accurately dimensioned, the cavity formed between the mould and the stamp is ill-defined and the ensuing confectionery shell is of unacceptable quality. This limitation also means that a mould/stamp combination designed for producing one shell thickness cannot be used to produce another thickness of shell without having a detrimental effect on product quality. Producing a new thickness of confectionery shell therefore requires a new set of well-designed and precision-manufactured moulds and stamps.

The commissioning and manufacture of each set of stamps and moulds is expensive and results in a time delay before a new thickness of confectionery shell can be produced of acceptable quality. Even when the required stamps and moulds are already available, installing these stamps and moulds halts production and is therefore also not cost-effective.

It is an object of the present invention to provide a method for manufacturing a confectionery shell which avoids the disadvantages associated with the above methods.

SUMMARY OF THE INVENTION

The present invention concerns a method for producing a confectionery shell comprising the steps of:
(i) depositing an edible liquid into a mould cavity;
(ii) pressing the edible liquid against the wall of the mould cavity using a stamp having a surface temperature below the solidification temperature of the edible liquid so as to shape and at least partially solidify the edible liquid in the mould cavity and cause part of the edible liquid to be ejected from the mould cavity wherein at least part of the ejected edible liquid is contiguous with the edible liquid inside the mould cavity;
(iii) removing the stamp from the mould cavity; and
(iv) removing edible liquid ejected from the mould cavity or material formed from ejected edible liquid by passing scraping means outwardly over the boundary of the mould cavity in two or more different outward directions.

This method enables a single mould and stamp to be used for producing confectionery shells of different thicknesses without compromising on product quality. In particular, the method forms confectionery shells having a clean edge partly because of the way in which edible liquid ejected from the mould cavity during step (ii), or material formed therefrom, is removed during step (iv). This clean edge is aesthetically pleasing to the consumer and enables filled confections to be formed with a clean bottom. The user therefore needs fewer moulds and stamps to make a wide variety of good quality confectionery shells, which represents a significant cost saving.

Furthermore, time delays caused by reconfiguring the confectionery shell-producing machinery are reduced because moulds and stamps do not need to be replaced for each new shell thickness. This reduced machinery downtime reduces the associated loss of production and therefore represents a further cost benefit to the user. The method moreover allows the user to produce new shell thicknesses at short notice because new moulds and stamps are not required for each new thickness. The method therefore enables the user to react more quickly to shifting market demands.

The ability to produce confectionery shells of different thicknesses also provides a useful way of compensating for weight differences between different types of fillings. Thus, a range of confections can be produced having different fillings but having near constant weight, which is more pleasing to the consumer.

The ability to vary the thickness of a confectionery shell enables the production of confectionery shells comprising inclusions of different sizes using a single set of stamps and moulds, which is a further embodiment of the present invention.

The ability to vary the thickness of a confectionery shell also enables the production of multi-layer confectionery shells using a single set of stamps and moulds, which is another further embodiment of the present invention.

DETAILED DESCRIPTION OF THE INVENTION

The method of the invention concerns the production of a confectionery shell. The shell can, for instance, be a shell for a praline, confectionery block or tablet, an individual confectionery item or a confectionery bar (countline).

"Liquid" in the context of the present invention means flowable, i.e. unsolidified to such an extent that the material flows under the action of gravity or an applied force. The liquid can have a range of viscosities, provided that it is capable of being deposited into the mould cavity using a conventional depositor and is capable of being cold-stamped using a conventional cold-stamping apparatus. The edible liquid may contain solid components, and therefore includes, for instance, gels, pastes, suspensions and emulsions. Pieces of solidified material present in the edible liquid can have a diameter of ≤80 μm, ≤70 μm, ≤60 μm, ≤50 μm, ≤40 μm or ≤35 μm. Moreover, solid material can be present in an amount of ≤80%, ≤75%, ≤70%, ≤60% or ≤50% by mass relative to the total mass of the edible liquid.

In one embodiment, the edible liquid is liquid chocolate, wherein chocolate includes plain, dark, milk, white and compound chocolate.

The edible liquid can also be a mixture of two or more edible liquids, provided that the overall mixture is flowable. The mixture can, for instance, be a mixture of two or more of plain, dark, milk, white and compound chocolate in liquid form.

The edible liquid can be treated prior to deposition to ensure that it has adequate flow properties for deposition and stamping, and to ensure that it has optimal solidification properties. For instance, chocolate can be tempered using a conventional method so that it contains stable crystals. This causes the chocolate to contract slightly upon contact with the stamp, which allows the stamp to be withdrawn without the shell adhering to the stamp.

The mould cavity may be one of a plurality of cavities. For instance, the mould may be a tray mould consisting of one or more lanes of cavities, the cavities also being arranged into rows (e.g. 2-6 rows). The size and shape of the cavity depends on the type of shell to be produced. In some embodiments, the cavity can have a substantially uniform inner surface which corresponds to the shape of the stamp such that a shell having a uniform thickness is produced when the stamp is pressed fully into the mould cavity.

The mould cavity may contain sub-cavities. For instance, the cavity may be for producing confections in tablet form, the tablet having blocks which can be broken into manageable pieces.

Figure 1:
FIG. 1: an edible liquid deposited within a mould cavity.

The edible liquid can be deposited into the mould cavity manually or using a conventional depositor such as a multi-nozzle depositor which deposits into multiple cavities simultaneously. In some embodiments, the edible liquid can be deposited into the mould cavity to form a layer 1 extending around the wall of the cavity and having a substantially even surface (see FIG. 1). This can be achieved by vibrating the mould 2, if necessary. Vibrating can be carried out using conventional apparatus known in the art.

Once the edible liquid has been deposited into the mould cavity, it is pressed using a stamp. A conventional cold-stamping apparatus may be employed to perform the pressing step. Such an apparatus comprises one or more stamps having a pressing surface. The stamps are usually made from an alloy/metal such as steel or aluminium. The apparatus also comprises a means for cooling the stamps. Cooling is typically achieved by circulating a cooling liquid through the apparatus between the stamps, the cooling liquid being at a temperature less than the desired temperature of the pressing surface of the stamp.

The stamp is immersed into the edible liquid, the immersed surface of the stamp having a temperature which is lower than the solidification temperature of this edible liquid. This ensures that the edible liquid is at least partially solidified by the stamp. Specifically, the edible liquid in contact with the stamp is solidified to form an inner "skin" which acts to maintain the shape of the shell when the stamp is withdrawn and provide a barrier to material subsequently filled into the shell. It is therefore not essential that the edible liquid is fully solidified during the pressing step. In this case, the edible liquid can be further solidified after the pressing step by cooling the entire mould.

In some embodiments, the edible liquid is not made brittle prior to the scraping step. Instead, the scraping step is sometimes performed when the edible liquid is in a leathery, or ductile, state. This reduces the risk of shell fracture during the scraping step The surface temperature of the stamp is dependent upon the solidification temperature of the edible liquid and the immersion period (the period in which the stamp is in contact with the edible liquid). In some embodiments, the stamp can have a surface temperature of less than 10° C., 0° C. or less, −5° C. or less, −10° C. or less, −15° C. or less, and can be in the range of −25° C. to 0° C., which helps to reduce the immersion period and produce a more rigid shell.

In some embodiments, the immersion period is less than 10, 9, 8, 7, 6 or 5 seconds, and can be 1-3 seconds.

Figure 2A:
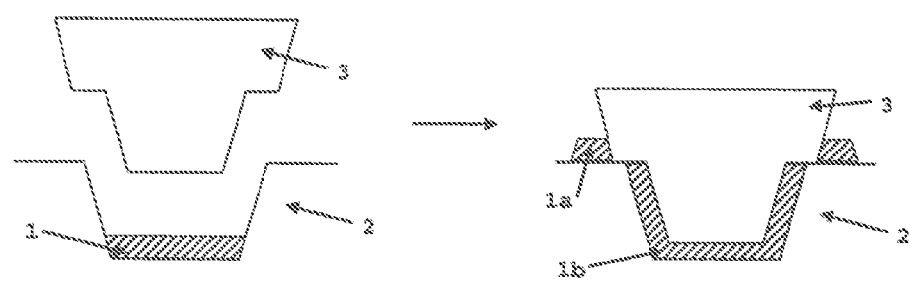
FIG. 2: immersing a stamp into a mould cavity. The stamp in FIG. 2a is immersed until it rests against the surface of the mould and edible liquid ejected from the mould cavity or material formed from ejected edible liquid is physically separated from edible liquid remaining within the mould cavity.
In FIG. 2b at least a part of the edible liquid ejected from the mould cavity or material formed from the ejected edible material is contiguous with edible liquid remaining within the mould cavity.

During the pressing step, the edible liquid conforms to the shape of the gap defined by the stamp 3 and the wall of the mould cavity (see FIG. 2). In FIG. 2a, the stamp 3 is pressed fully into the mould 2, which has the effect that no part of the edible liquid ejected outside the mould cavity or material formed from ejected edible liquid (together referred to as ejected "edible material" 1a hereinafter) is contiguous with the edible liquid 1b inside the mould cavity. "Contiguous" here means a direct physical contact between edible material ejected from the mould cavity and edible liquid remaining within the mould cavity. "Material formed from ejected edible liquid" is edible liquid which has changed in some way after having been ejected from the mould cavity and includes, for instance, edible liquid which has at least partially solidified. Pressing the stamp fully into the mould cavity, as shown in FIG. 2a, is the conventional use of a stamp and mould and produces confectionery shells of consistent dimensions. However, the required pressing of the stamp fully into the mould cavity restricts each stamp/mould combination to forming a solitary shape of confectionary shell.

Figure 2B:
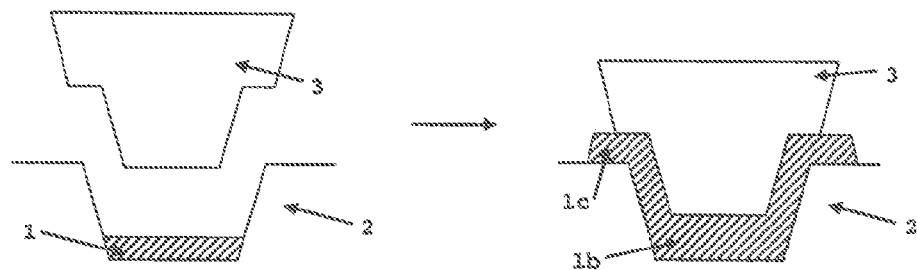

In contrast, FIG. 2b shows a pressing step in which at least a part of the edible material 1c ejected from the mould cavity is contiguous with the edible liquid 1b inside the mould cavity. FIG. 2b therefore schematically represents a pressing step falling within the scope of the invention. This can, for instance, occur when a stamp is not pressed fully into a mould cavity. The ensuing gap between the stamp and the mould allows ejected edible material 1c to remain contiguous with the non-ejected edible liquid 1b.

Figure 3A:
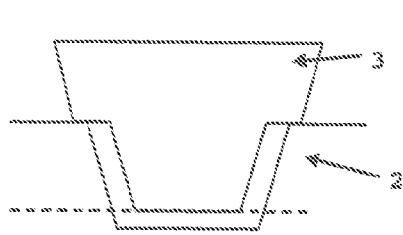
FIG. 3: a stamp halted a distance 'y' (FIG. 3b) short of the position at which it is pressed fully into the mould cavity (FIG. 3a).

Incomplete pressing of the stamp into the mould cavity allows the user to form confectionery shells having a greater thickness than is achieved when the stamp is fully pressed into the mould cavity. The increase in shell thickness can therefore be adjusted by halting the stamp a set distance short of the full pressing position. Here, the "full pressing position" is the position of the stamp when it is pressed to its fullest extent into the mould cavity (i.e. the position in FIG. 3a). Thus, halting the pressing movement a distance 'y' short of the full pressing position increases the thickness of the shell in the direction the stamp moves by an amount 'y' (see FIG. 3b).

Moreover, halting the pressing movement a distance 'y' short of the full pressing position produces a confectionery shell in which generally the thickness of the confectionery shell wall itself increases away from the open end of the shell. That is, shell thickness is generally increased to a lesser extent in regions of the shell closer to its open end. A confectionery shell in which the thickness of the wall itself varies provides the benefits of a more voluminous confectionery shell without having to increase shell thickness throughout its entirety. For instance, relatively large inclusions can be accommodated in the thicker regions of the confectionery shell without unduly increasing the shell thickness throughout the whole shell.

Figure 4A:
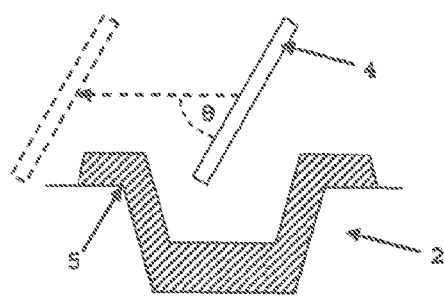
FIG. 4: removing edible liquid ejected from the mould cavity or material formed from the ejected edible liquid by moving scraping means outwardly (FIG. 4a) and inwardly (FIG. 4b) over the boundary of the mould cavity.

Once the stamp has been withdrawn from the mould cavity, edible material ejected from the mould cavity is removed by passing scraping means 4 outwardly over the boundary 5 of the mould cavity in two or more different outward directions (see FIG. 4a). The scraping means passed in each outward direction can be the same or different, and in some embodiments each scraping means is suitably a knife, which can be made of plastic, ceramic, metal and/or alloy. For instance, one or more scraping means can be a metallic knife. The temperature of each scraping means can be ambient temperature. The boundary 5 of the mould cavity is the border where the surface of the mould not forming the mould cavity meets the surface of the mould forming the mould cavity; it therefore has a mould cavity side and a non-mould cavity side.

Figure 4B:
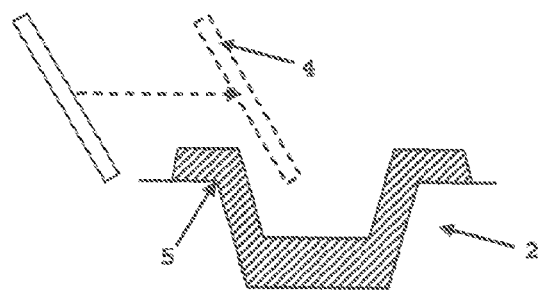

"Outward" direction means from the mould cavity side of the boundary 5 to the non-mould cavity side. Thus, the outward direction is opposite to the "inward" direction shown in FIG. 4b, wherein the scraping means is moving from the non-mould cavity side of the boundary 5 to the mould cavity side.

In some embodiments, each outward direction of the scraping means is substantially in the plane of the mould surface on the non-mould cavity side of the boundary 5. Here substantially in the plane means that the angle formed between the outward direction of the scraping means and the plane of the mould surface on the non-mould cavity side of the boundary 5 is 45° or less.

In some embodiments, each outward direction of the scraping means generally avoids crossing the boundary 5 of the mould cavity in an inward direction. Minor inward crossing of the mould boundary is tolerated where, for instance, the shape of the boundary makes crossing the boundary inwardly necessary from a practical point of view. This could be where, for example, the shape of the boundary of the mould cavity is particularly elaborate.

Figure 6A:
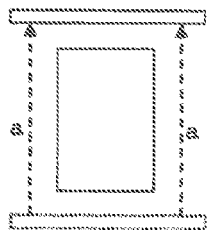
FIG. 6: scraping directions shown on a plan view of a mould cavity.
Figure 6B:
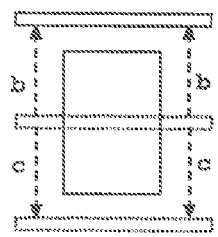
Figure 6C:
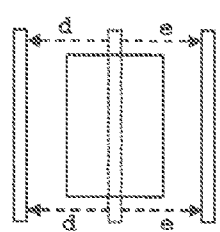

In one embodiment, at least two of the outward directions are substantially opposite. That is to say, at least two outward directions form an angle of 180±5° (as shown in FIGS. 6b and 6c). Scraping means can be passed over the boundary 5 of the mould cavity in two to four or four or more different outward directions. In some embodiments, scraping means are passed over the boundary 5 of the mould cavity in four different outward directions. In one embodiment where scraping means are passed over the boundary 5 of the mould cavity in four or more different directions, at least two pairs of outward directions can be substantially opposite. That is to say, at least two pairs of outward directions form and angle within each pair of 180±5° (shown as separate pairs of directions in FIG. 6b and FIG. 6c).

The outward direction of the scraping means causes at least a part of the scraping means to begin the scraping motion on the mould cavity side of the boundary 5. The relative dimensions of the boundary 5 and the scraping means 4 may mean that parts of the scraping means begins the scraping motion on the side of the boundary 5 opposite to the mould cavity, but this can be tolerated provided that the scraping means passes over the boundary 5 in an overall outwardly direction.

Figure 5A:
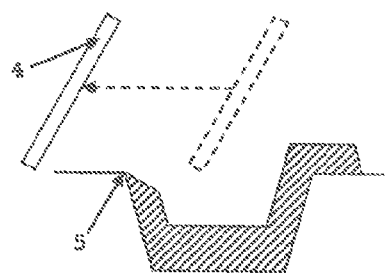
FIG. 5: edges of a confectionery shell formed when scraping means is passed outwardly (FIG. 5a) and inwardly (FIG. 5b) over the boundary.

By passing the scraping means over the boundary 5 in an outward direction, ejected edible material is removed whilst providing the confectionery shell with an edge substantially free of defects (see FIG. 5a). In particular, ejected edible material remaining contiguous with edible liquid inside the mould cavity is removed whilst avoiding defects on the edge of the confectionery shell. In some embodiments, this scraping motion can cause the wall forming the confectionery shell itself to taper towards the newly-formed edge. This can be caused by edible liquid forming the confectionery shell adhering to the scraping means to some extent such that is dragged away by the movement of the scraping means. This tapered edge is beneficial if and when a finishing layer is formed across the open end of the confectionery shell (i.e. bottoming the shell) because a clean edge is formed.

Figure 5B:
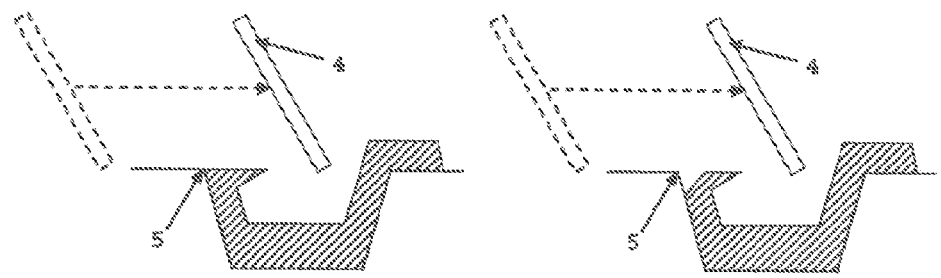

In contrast, passing the scraping means over the boundary 5 in an inward direction causes defects along the edge of the confectionery shell. FIG. 5b illustrates two types of such defects. In the first illustration, the scraping means has caused a lip to form at the edge of the confectionery shell. In the second illustration, the scraping means has caused part of the confectionery shell to be detached from the wall of the mould cavity. Both of these types of defects make the confectionery shell less appealing to the consumer and inhibit the formation of a clean edge when a finishing layer is formed across the open end of the confectionery shell.

The scraping means 4 forms an applied scraping angle θ with the scraping direction (see FIG. 4a). The applied scraping angle in some embodiments can be 200 or more and in some embodiments can be 45° or less. The applied scraping angle in some embodiments is in the range of from 20° to 45°. When the scraping angle is 20° or more, the edible material ejected from the mould cavity which is contiguous with the edible liquid in the mould cavity is more efficiently separated from the edible liquid within the mould. This is thought to be because the scraping means is more likely to penetrate into the ejected material than ride over its surface. When the scraping angle is more than 45°, removal of ejected material is less effective. This is thought to be because the scraping means tends to bend and enter the mould cavity.

Prior to the scraping process, the mould can, in some embodiments, be orientated so that edible material removed by scraping falls away from the mould under gravity. This helps to prevent removed edible material from collecting in the mould cavities. If edible liquid within mould cavities orientated in this way is already solidified to the extent that is does not flow or deform within the mould cavity, then it is less likely to deform during this step. The open end of the mould cavities can sometimes face downwards during the scraping process in order to minimise the amount of removed edible material collecting in the mould cavities.

The shell may be de-moulded following pressing, cooling and scraping. On the other hand, further steps may be performed before de-moulding. For instance, a further confectionery shell may be formed inside the confectionery shell just formed. Such a further confectionery shell can be a moisture barrier. In addition, the shell may be filled with, for example, a filling material such as chocolate, cream, caramel, toffee, ganache, emulsion, truffle, alcohol, fruit and combinations thereof. A finishing layer may be formed on the filling to fully enclose it.

A further embodiment of the invention concerns the production of confectionery shells comprising one or more inclusions. In the context of this application, an "inclusion" is a piece of edible material having a different composition to that of the edible liquid deposited into the mould cavities. An inclusion is suitably a solid component, examples of which are pieces of caramel, toffee, chocolate, fruit, nut, candy etc. In some embodiments, the smallest dimension of each inclusion is at least 0.1 mm.

In this embodiment, the pressing step of the first embodiment is performed when the mould cavity contains edible liquid of the first embodiment and one or more inclusions. The mass of inclusion(s) present with the edible liquid is not particularly limited, but can be ≤50% by mass or ≤30% by mass relative to the mass of edible liquid deposited in the mould cavity More than one type of inclusion can be present with the edible liquid in the mould cavity. Where more than one type of inclusion is present, the total amount of inclusions can be the same as mentioned above for one type of inclusion.

The size of inclusions is not particularly limited, provided that they can be accommodated within a confectionery shell without protruding outside the shell. Such protrusion could result in damage to the inclusion during subsequent processing steps and a corresponding loss of product quality. Accommodation within the confectionery shells can be achieved by ensuring that at least one of the dimensions of each inclusion is less than or equal to the thickness of the region of the confectionery shell in which it is accommodated.

The process by which inclusions and the edible liquid become coexistent in the mould cavity is not particularly limited. The inclusions and the edible liquid can be combined before being deposited into the mould cavity or can be combined only once inside the mould cavity. Where the inclusions and the edible liquid are combined only once inside the mould cavity, the inclusions can be deposited in the mould cavity before or after the edible liquid is deposited.

Because the method of the present invention enables the production of confectionery shells of different thicknesses, the method can be used to produce confectionery shells accommodating inclusions of varying sizes. As mentioned above, this product variation is achieved without replacing the stamps and moulds and without compromising product quality. This means that confectionery shells can be produced accommodating different sized inclusions without the need for expensive new stamps and moulds and without halting production during which fresh stamps and moulds are fitted.

Changing the thickness of the confectionery shell also enables the user to vary the extent to which the inclusions are visible to the consumer. Specifically, conducting the pressing step to produce a thicker shell will cause the inclusions to be less visible to the consumer, whereas a thinner shell will cause the inclusions to be more visible to the consumer. Whilst inclusions can be made more visible, in some embodiments the inclusions do not protrude beyond the outer surface of the confectionery shell because the protruding inclusion is susceptible to damage during subsequent processing steps. As mentioned above, the shell thickness can be changed without compromising on product quality, and in particular the edge of the confectionery shell is substantially free of defects.

Moreover, and as mentioned above, the method of the present invention can be used to make confectionery shells in which the thickness of the shell itself varies. If the stamp is not pressed fully into the mould, the thickness of the ensuing confectionery shell will generally be greater in regions further from the open end of the shell. Relatively large inclusions can therefore be accommodated in the thicker regions of the confectionery shell without unduly increasing the thickness of the entire shell.

A yet further embodiment of the invention relates to the production of multi-layered confectionery shells. "Multi-layered" here means two or more layers, adjacent layers differing from one another in some identifiable way. For instance, adjacent layers can differ in terms of their composition and/or colour. Adjacent layers do not, however, necessarily form a distinct boundary; adjacent layers can sometimes be mixed to a certain extent to form a boundary zone, provided that the layers on either side are distinguishable.

The composition of each layer is not particularly limited, provided that each layer is made from edible material. In some embodiments, the outermost layer can comprise a chocolate composition and at least one other layer is a layer comprising a (moisture) barrier composition. In some embodiments, the outermost layer can be a chocolate layer and the innermost layer can be a moisture barrier layer.

A moisture barrier composition can be used to prevent moisture transfer from the confection to the environment or within the confection into moisture-sensitive components (e.g. chocolate), especially if the shell is to be filled with a component having a high water activity (e.g. a fresh fruit composition). The moisture barrier composition can be any conventional moisture barrier composition such as a fat-based moisture barrier composition or a heterogeneous moisture barrier composition, both of which contain crystalline fats.

In this embodiment, the depositing and pressing steps can be performed in a mould cavity in which one or more confectionery shells has already been formed. The scraping step may or may not have been performed on the one or more confectionery shells already existing inside the mould cavity.

Moreover, the method of this embodiment can be used to prepare a multilayer confectionery shell using a single set of stamps and moulds without adversely affecting product quality. This is achieved by reducing the distance which the stamp penetrates into the mould cavity to form each successive confectionery shell. Although some edible material ejected from the mould cavity might be contiguous with the edible liquid remaining in the mould cavity, this is readily removed by the scraping procedure described above.

It is moreover realised that features of the further embodiments can be readily combined. For instance, one or more of the layers of the multi-layered confectioner/shell of this further embodiment may contain inclusions of varying sizes according to the first further embodiment.

The above-described process is further illustrated by the following Examples, which should not in any way be construed as limiting the scope of the invention.

EXAMPLES

Comparative Example 1

Tempered Milka® chocolate mass (55±1.5 g, manufactured by Kraft Foods) was manually deposited at 30° C. into 1 cavity of a stamp mould (Brunner-Glonn, Germany). The mould was previously stored in a heating cabinet for 2 days at 30° C. The mould was vibrated for 30 seconds using a Knobel® VT DUO/H shaking table (z Freq.: 100 Hz; y Freq.: 100 Hz; y Ampl.: 3 mm) to even the surface of the chocolate mass in the cavities.

The chocolate mass was then pressed in the mould cavity using a Knobel® Cold Stamp unit (CP Standard Cold Press Type 07-KCM-09, Knobel, Felben CH). The immersion period was set to 7 seconds, the surface of the stamp was −4.9° C. and the stamp speed was 60 mm s$^{-1}$. The stamp was pressed into the cavity to its fullest extent (i.e. the position of the stamp corresponded to y=0 mm in FIG. 3b).

The stamp was withdrawn and the mould stored at ambient temperature for 5 minutes before excess material extending outside the mould cavity was removed by scraping. Scraping was conducted in one scraping action along the long sides of the mould cavity and across its full length (i.e. motion "a" in FIG. 6a). The scraping means used was a metallic knife at ambient temperature and an applied scraping angle of 45°.

The mould was cooled to a temperature of 10° C. over a period of 15 min. The chocolate shell was filled with Milka® milk chocolate mouse at a temperature of 28.5° C. The filled shell was cooled for 60 minutes at a temperature of 10° C. before being bottomed using Milka® chocolate mass. The confection was cooled at a temperature of 10° C. for 60 minutes before being manually removed from the mould cavity ready for visual inspection.

Comparative Example 2

Figure 3B:
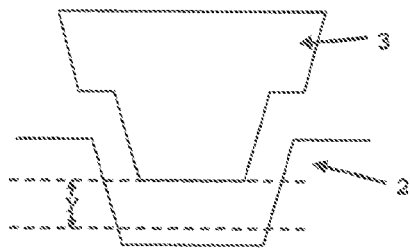

Comparative Example 2 was conducted in the same manner as Comparative Example 1 except that the pressing motion of the stamp was halted 0.3 mm short of the final position attained in Comparative Example 1 (i.e. y=0.3 mm in FIG. 3b).

Example 1

Example 1 was conducted in the same manner as Comparative Example 2 except that the scraping step comprised two scraping actions. One scraping action was made from the middle of the mould cavity along the long sides and outwards over one of the short sides (i.e. motion 'b' in FIG. 6b) and one scraping action from the middle of the mould cavity along the long sides and outwards over the other short side (i.e. motion 'c' in FIG. 6b).

Example 2

Example 2 was conducted in the same manner as Comparative Example 2 except that the scraping step comprised four scraping actions. The four scraping actions were made from the middle of the mould cavity outwardly across each of the four sides of the mould cavity (i.e. motions 'b' and 'c' in FIG. 6b and motions 'd' and 'e' in FIG. 6c).

Certain aspects of Comparative Examples 1 and 2 and Examples 1 and 2 are shown in Table 1 below.

TABLE 1

| Example/ | Stamp Finish | Shell | Scraping Parameters | |
|---|---|---|---|---|
| Comp. Example | Position (y) [mm] | Thickness [mm] | No. of Scrapes | Direction |
| Comp. Ex. 1 | 0.0 | 1.1 | 1 | Outside |
| Comp. Ex. 2 | 0.3 | 1.4 | 1 | Outside |
| Ex. 1 | 0.3 | 1.4 | 2 | Inside to short sides |
| Ex. 2 | 0.3 | 1.4 | 4 | Inside to all sides |

Visual inspection of the de-moulded confections is summarised below.

TABLE 2

| Example/ Comp. Ex. | Result | Comments |
|---|---|---|
| Comp. Ex. 1 | Bottom free of defects | Benchmark quality |
| Comp. Ex. 2 | Defects along all bottom sides | Unacceptable quality |
| Ex. 1 | Minor slide defects along long sides | Similar quality to Comp. Ex. 1. |
| Ex. 2 | Bottom free of defects | Product quality judged to be the same as Comp. Ex. 1. and slightly better than Ex. 1 |

Comparative Example 1 illustrates the benchmark quality of product obtained when stamps are pressed fully into mould cavities. Comparative Example 2 illustrates some of the problems caused when the same mould/stamp combination is used to prepare a confectionery shell of greater thickness by not fully pressing the stamps into the mould cavities.

Example 1 shows that the product defects of Comparative Example 2 can be avoided using a method according to the present invention. Only the rims of the long sides show any defects, and these defects are only minor. The quality of product obtained in Example 2 was indiscernible from that of Comparative Example 1.

Example 3

Tempered Milka® white chocolate mass (100±1.5 g, manufactured by Kraft Foods) at a temperature of 28.5° C. and six Smarties® (manufactured by Nestlé) were manually deposited into cavities in a stamp mould (Brunner-Glonn, Germany). The mould was previously stored in a heating cabinet for 2 days at 28.5° C. The mould was then vibrated for 30 seconds using a Knobel VT DUO/H shaking table (z Freq.: 100 Hz; y Freq.: 100 Hz; y Ampl.: 3 mm).

The mixture was pressed in the mould cavities using a Knobel® Cold Stamp unit (CP Standard Cold Press 07-KCM-09, Knobel, Felben CH). The immersion period was set to 7 seconds, the surface of the stamps was −6° C. and the stamp speed was 60 mm s$^{-1}$. The stamps were halted 4.5 mm short of the maximum pressing position (i.e. y=4.5 mm in FIG. 3b).

The stamps were withdrawn from the mould cavities and the mould was stored at ambient temperature for 5 minutes before excess material extending outside the cavity was removed by two scraping motions. One scraping action was made from the middle of the mould cavity along the long sides and outwards over one of the short sides (i.e. motion 'b' in FIG. 6b) and one scraping action from the middle of the mould cavity along the long sides and outwards over the other short side (i.e. motion 'c' in FIG. 6b). The scraping means used was a metallic knife at ambient temperature and an applied scraping angle of 45°.

The mould was cooled to 10° C. over a period of 60 min and the confectionery shell removed ready for visual inspection.

Example 4

Example 4 was conducted in the same manner as Example 3 except that 10 g of Smarties® was placed in the mould cavities instead of the 6 Smarties® used in Example 3.

Example 5

Example 5 was conducted in the same manner as Example 3 except that chopped almonds (15 g, purchased from Brand Schwartau) was placed in the mould cavities instead of the 6 Smarties® used in Example 3 and the stamps were halted 3.9 mm short of the maximum pressing position (i.e. y=3.9 mm in FIG. 3b).

Example 6

Example 6 was conducted in the same manner as Example 5, except that the stamps were halted 3.0 mm short of the maximum pressing position (i.e. y=3.0 mm in FIG. 3b).

Example 7

Example 7 was conducted in the same manner as Example 3, except that chocolate tubes (15 g, purchased from Brand Schwartau) were placed in the mould cavities instead of the 6 Smarties® used in Example 3 and the stamps were halted 2.0 mm short of the maximum pressing position (i.e. y=2.0 mm in FIG. 3b).

Example 8

Example 8 was conducted in the same manner as Example 3 except that 10 g of the chocolate tubes were placed in the mould cavities instead of 15 g and the stamps were halted 1.0 mm short of the maximum pressing portion (i.e. y=1.0 mm in FIG. 3b).

Certain aspects of Examples 3-8 are shown in Table 3 below.

TABLE 3

| Ex./ Comp. Ex. | Inclusion | | | Stamp Finish Position (y) [mm] | Shell Thickness [mm] |
| --- | --- | --- | --- | --- | --- |
| | Type | Shape and Dimensions | Amount | | |
| Ex. 3 | Smarties | Disc: width 8 mm; height 4 mm | 6 (#) | 4.5 | 5.6 |
| Ex. 4 | Smarties | Disc: width 8 mm; height 4 mm | 10 g | 4.5 | 5.6 |
| Ex. 5 | Chopped Almonds | Spherical: diameter 4 mm | 15 g | 3.9 | 5.0 |
| Ex. 6 | Chopped Almonds | Spherical: diameter 4 mm | 15 g | 3.0 | 4.1 |
| Ex. 7 | Chocolate Tubes | Tube: length 10 mm; diameter 1 mm | 15 g | 2.0 | 3.1 |
| Ex. 8 | Chocolate Tubes | Tube: length 10 mm; diameter 1 mm | 10 g | 1.0 | 2.1 |

Visual inspection of the de-moulded confections provided the following results.

TABLE 4

| Example/ Comp. Ex. | Result | Comments |
| --- | --- | --- |
| Ex. 3 | Good result, inclusions not damaged. | Acceptable |
| Ex. 4 | Inclusions were smashed during the cold stamping step due to the geometry of the tablet. | Acceptable |
| Ex. 5 | Good result, inclusions not damaged. Inclusions less visible than in Ex. 6. | Acceptable |
| Ex. 6 | Good result, inclusions not damaged. Inclusions more visible than in Ex. 5. | Acceptable |
| Ex. 7 | Good result, inclusions not damaged. | Acceptable |
| Ex. 8 | Good result, inclusions not damaged. | Acceptable |

The invention claimed is:

1. A method for producing a confectionery shell comprising the steps of:
   (i) depositing into a mould cavity an edible liquid and one or more pieces of solidified edible material having a different composition to that of the edible liquid;
   (ii) pressing the edible liquid against a wall of the mould cavity using a stamp having a surface temperature below a solidification temperature of the edible liquid so as to shape and at least partially solidify the edible liquid in the mould cavity and cause part of the edible liquid to be ejected from the mould cavity wherein at least part of the ejected edible liquid is contiguous with the edible liquid inside the mould cavity;
   (iii) removing the stamp from the mould cavity; and
   (iv) removing edible liquid ejected from the mould cavity or material formed from ejected edible liquid by passing one or more scraping devices outwardly over a boundary of the mould cavity in two or more different outward directions from a mould cavity side of the boundary toward a non-cavity side of the boundary at an applied scraping angle θ relative to the direction of scraping.

2. The method according to claim 1, wherein step (iv) comprises passing the scraping device outwardly over the boundary of the mould cavity in from two to four different outward directions.

3. The method according to claim 1, wherein step (iv) comprises passing the scraping device outwardly over the boundary of the mould cavity in four different outward directions.

4. The method according to claim 1, wherein applied scraping angle θ of the scraping device in step (iv) relative to the direction of scraping is 20° or more.

5. The method according to claim 1, wherein applied scraping angle θ of the scraping device in step (iv) relative to the direction of scraping is 45° or less.

6. The method according to claim 1, wherein each piece of solidified edible material has a smallest dimension of at least 0.1 mm.

7. The method according to claim 1, wherein the mould cavity in step (i) includes one or more pre-existing shells of at least partially solidified edible material conforming to the mould cavity.

8. The method according to claim 7, wherein the one or more pre-existing shells of at least partially solidified edible material in step (i) have a different composition to that of the edible liquid deposited into the mould cavity in step (i).

9. The method according to claim 1, wherein the edible liquid is fat-based.

10. The method according to claim 1, wherein the edible liquid is chocolate-based.

11. The method according to claim 1, wherein in step (iv) an open side of the mould cavity is facing downwards.

12. A confectionery shell obtained by the method according to claim 1.

13. The confectionery shell according to claim 12, wherein the thickness of the confectionery shell increases away from an open end of the shell.

14. A confection comprising the confectionery shell according to claim 12.

15. The method of claim 1, wherein the pressing step includes halting the stamp short by a distance short of a full pressing position.

16. The method of claim 15, wherein the distance short of the full pressing position is based upon the dimensions of the one or more pieces of solidified edible material.

* * * * *